(12) United States Patent
Weidinger

(10) Patent No.: US 8,114,919 B2
(45) Date of Patent: Feb. 14, 2012

(54) MICROWAVE FOAM

(75) Inventor: Juergen Weidinger, Polling (DE)

(73) Assignee: Wacker Chemie AG, Munich (DE)

( * ) Notice: Subject to any disclaimer, the term of this patent is extended or adjusted under 35 U.S.C. 154(b) by 665 days.

(21) Appl. No.: 11/852,345

(22) Filed: Sep. 10, 2007

(65) Prior Publication Data
US 2008/0064776 A1 Mar. 13, 2008

(30) Foreign Application Priority Data
Sep. 12, 2006 (DE) .......................... 10 2006 042 687

(51) Int. Cl.
C08J 9/00 (2006.01)
C08J 9/06 (2006.01)

(52) U.S. Cl. ............. 521/85; 264/417; 521/92; 521/915

(58) Field of Classification Search .................. 521/146, 521/91, 92, 154, 85, 915; 264/417
See application file for complete search history.

(56) References Cited

U.S. PATENT DOCUMENTS

| | | | | |
|---|---|---|---|---|
| 3,189,243 A * | 6/1965 | Lux | ............................... | 206/494 |
| 3,454,357 A * | 7/1969 | Rhees et al. | ................... | 423/659 |
| 3,848,038 A | 11/1974 | Dench et al. | | |
| 4,026,844 A | 5/1977 | Kittle et al. | | |
| 4,460,713 A | 7/1984 | Lee et al. | | |
| 4,686,244 A * | 8/1987 | Dietlein et al. | ............... | 521/179 |
| 4,980,384 A * | 12/1990 | Takahashi et al. | .............. | 521/91 |
| 5,061,736 A | 10/1991 | Takahashi et al. | | |
| 5,118,719 A * | 6/1992 | Lind | ............................... | 521/92 |
| 5,438,081 A | 8/1995 | Lewis et al. | | |
| 2002/0002210 A1 * | 1/2002 | Brzoskowski et al. | ......... | 521/93 |

FOREIGN PATENT DOCUMENTS

| | | |
|---|---|---|
| DE | 3923913 A1 | 2/1991 |
| DE | 689 18 648 T2 | 2/1995 |
| DE | 692 07 040 T2 | 6/1996 |
| DE | 43 34 453 C2 | 10/2002 |
| DE | 10 2004 053 309 B3 | 3/2006 |
| DE | 10 2004 053 310 A1 | 5/2006 |
| EP | 0 351 544 A2 | 1/1990 |
| JP | 2-175735 A | 7/1990 |
| JP | 4065468 A | 3/1992 |
| JP | 5-156061 A | 6/1993 |
| JP | 9-194620 A | 7/1997 |
| JP | 11-130896 A | 5/1999 |

OTHER PUBLICATIONS

"sodium carbonate." The Columbia Electronic Encyclopedia. © 1994, 2000-2006, on Infoplease. © 2000-2007 Pearson Education, publishing as Infoplease. <http://www.infoplease.com/ce6/sci/A0845790.html>.*
Shimin Wu et al., Concise Fine Chemical Industry Dictionary, p. 990, Liaoning Science & Technology Publishing House, 1999.
English Derwent Abstract AN 1992-325303 [40] corresponding to DE 692 07 040 T2.
English Derwent Abstract AN 1989-285284 [39] corresponding to DE 689 18 648 T2.
English Patbase Abstract corresponding to DE 10 2004 053 310 A1.
English Patbase Abstract corresponding to DE 39 23 913 A1, Feb. 7, 1991.
English Patbase Abstract corresponding to DE 43 34 453 C2, Oct. 24, 2002.

* cited by examiner

*Primary Examiner* — Randy Gulakowski
*Assistant Examiner* — Kara Negrelli
(74) *Attorney, Agent, or Firm* — Brooks Kushman P.C.

(57) ABSTRACT

Compositions foamable by exposure to microwave energy contain:

(A) at least one compound bearing crosslinkable organic radicals for crosslinking, (B) at least one blowing agent which releases gas on heating, (C) at least one metal powder or metal compound, for example a metal oxide, individually, or a mixture thereof, which has microwave activity.

Foams of uniform cell structure can be formulated with wide processing latitude.

11 Claims, No Drawings

MICROWAVE FOAM

BACKGROUND OF THE INVENTION

1. Field of the Invention

The invention relates to a composition for producing foams.

2. Background Art

The chemical structure of polysiloxane-containing (silicone-containing) elastomers, thermoplastic elastomers, and resins, does not give them microwave activity. They are therefore not heatable or crosslinkable (vulcanizable) by microwave radiation—without specific additives or fillers. Use of fillers having microwave activity, e.g., magnetite (cf., for example, DE 10 2004 053 310 A1, DE 10 2004 053 309 B3) can achieve rapid heating of the rubber or of the crude compositions, and can therefore achieve crosslinking to give the elastomer or resin, with the aid of suitable vulcanization additives (e.g., peroxides or noble metal catalysts).

The use of microwaves for the heating of plastics is well known in the thermoplastics field (e.g., EP 0 351 544, DE 39 23 913 A1), and is also used in the field of organic elastomers (for example DE 692 07 040 T2), or generally in the polymer field (for example DE 689 18 648 T2, DE 43 34 453 C2)). However, for the abovementioned reasons, this method has not been used, or has not been used widely, in the field of polysiloxane plastics (U.S. Pat. Nos. 4,980,384, 4,460,713). None of the compounds described in the prior art can give a homogeneous foam.

Traditional foaming of, for example, siloxane-containing polymers uses external heating elements of very varied type to introduce heat from outside into the formulation to be foamed, this heating being needed not only for vulcanization but also to activate (decompose), for example, metastable foam-blowing agents. The following disadvantages result for the foam part to be produced:

- the problem of a critical balance of crosslinking and expansion (e.g., little processing latitude, and little opportunity for control);
- a surface problem, e.g., a risk of pores breaking through the surface skin if these have not been adequately crosslinked throughout;
- the problem of inhomogeneous foam structure, e.g., production of large and small pores, and also of regions without pore formation;
- the problem of dimensional stability, e.g., lack of reproducible shape and lack of exact adjustment of part dimensions, due inter alia to the abovementioned problems;
- the problem of restricted heat transfer, e.g., the foam being produced is even less efficient than the crude composition in conducting heat from the outside to the inside, thus expansion shortfalls and/or vulcanization shortfalls occur in the interior.

These factors give rise to the disadvantages known to the person skilled in the art in the traditional heat-induced foaming of siloxane-containing compositions:

- the entire process is metastable to unstable;
- there is but restricted selection of processing methods when comparison is made with conventional thermoplastics, elastomers, etc.;
- a restricted selection of processing parameters;
- production of parts with high dimensional accuracy or of parts which always have the same homogeneous foam structure is not possible;
- complicated and expensive equipment is needed;
- the cost for design and development of foam parts is very high.

SUMMARY OF THE INVENTION

It is an object of the invention to improve the prior art, and in particular to produce homogeneous foams. These and other objects are achieved by providing microwave-foamable comparisons containing at least one crosslinkable component, a powdered metal or metal compound, and at least one blowing agent.

DETAILED DESCRIPTION OF THE PREFERRED EMBODIMENT(S)

The invention thus provides a composition comprising:
(A) at least one compound bearing crosslinkable organic radicals,
(B) at least one blowing agent which on heating releases gas, vapor or fume,
(C) at least one metal powder, metal compound, or metal oxide, individually, or as a mixture thereof, as long as these have microwave activity.

The inventive compositions can be a single-component composition or a multicomponent composition. In the latter case, the components of the inventive compositions can comprise any of the constituents in any desired combination.

In the (A) compounds which have organic radicals for crosslinking, the radicals are preferably those containing aliphatic carbon-carbon multiple bonds. The compounds bearing organic radicals suitable for crosslinking are preferably peroxidically crosslinking, sulfur-crosslinking, bisphenol-crosslinking, or platinum-catalyzed-addition-crosslinking compounds. Examples include isoprenes, nitrile polymers, polybutadienes, etc.

The constituent (A) in the inventive composition is preferably an aliphatically unsaturated organosilicon compound, it being possible to use any of the aliphatically unsaturated organosilicon compounds useful for crosslinkable compositions, including by way of example, silicone block copolymers having urea segments, silicone block copolymers having amide segments and/or imide segments and/or ester-amide segments and/or polystyrene segments and/or silarylene segments and/or carborane segments, and silicone graft copolymers having ether groups.

The molar mass of the constituent (A) can vary within wide limits, preferably, for example, from $10^2$ to $10^6$ g/mol, more preferably from $10^3$ to $10^5$ g/mol By way of example, therefore, the constituent (A) can be a relatively low-molecular-weight alkenyl-functional oligosiloxane, such as 1,2-divinyltetramethyldisiloxane, but can also be a high molecular weight polydimethylsiloxane polymer which has pendant or terminal Si-bonded vinyl groups, for example one whose molar mass is $10^5$ g/mol (number average, determined by means of NMR). There is also no restriction relative to the structure of the molecules forming the constituent (A); in particular, the structure of a relatively high-molecular-weight, i.e., oligomeric or polymeric, siloxane can be linear, cyclic, branched, or else resin-like, network-like. Linear and cyclic polysiloxanes are preferably composed of units of the formula $R_3SiO_{1/2}$, $R^1R_2SiO_{1/2}$, $R^1RSiO_{2/2}$, and $R_2SiO_{2/2}$, where R and $R^1$ can be identical or different organic groups, such as methyl, propyl, trifluoropropyl, vinyl, phenyl, or substituents, such as $OR^3$, $NR^3_2$, etc., where $R^3$ in turn itself can be organic groups or substituents, as described. Branched and network-like polysiloxanes also contain trifunctional and/or tetrafunctional units, those of the formulae $RSiO_{3/2}$, $R^1SiO_{3/2}$, and $SiO_{4/2}$ being preferred. It is also possible to use a mixture of different siloxanes complying with the criteria of constituent (A).

It is particularly preferable to use, as component (A), vinyl-functional, substantially linear polydiorganosiloxanes whose viscosity is from 0.01 to 500,000 Pa·s, more preferably from 0.1 to 100,000 Pa·s, in each case at 25° C.

The amounts of the compounds which have organic radicals suitable for crosslinking are preferably from 1 to 99% by weight, preferably from 20 to 70% by weight, based on the entire composition.

Blowing agents (B) that can be used are any of the gases which at atmospheric pressure or elevated pressure are physically soluble in the matrix or at least temporarily capable of introduction into the same, or else chemical compounds which release gas on exposure to heat, e.g., azo compounds (e.g., AIBN, azoisobutyronitriles, which release nitrogen), carbonates (such as sodium carbonate, which release $CO_2$), peroxides (such as $BaO_2$, which release oxygen), or else compounds which comprise gases enclosed in hollow beads or in cavities, or preferably blowing agents which comprise volatile liquids and which comprise a liquid or a gas either in dispersed form and/or in included form (in the form of water of crystallization or intercalated liquid or included gas), and which release this in gas form (examples being $N_2$, $CO_2$, $O_2$, water vapor, etc.) on heating, via a reaction or by a purely physical process.

Liquid substances suitable for blowing agent composition (B) are preferably selected from the group consisting of organic and inorganic solvents. These solvents are preferably selected from the group consisting of water, alcohols, amines, THF, pentane, hexane, toluene and ethers and mixtures of these. Water is a particularly preferred liquid blowing agent.

As a function of the character of the blowing agent composition (B), there can be very different types of binding of the composition to the blowing agent, examples being purely physical inclusion, adsorption, covalent bonding, complexing, or any other type of chemical bonding.

All of these blowing agents share potential volatility at relatively high temperatures, with breakdown of the lattice in the case of liquid of crystallization, and on achievement of the energy threshold for bond breaking in the case of intercalated liquid. This means that, given correct choice of the blowing agent (B), it is possible to adjust foaming behavior, for example at the temperatures customary for elastomer processing, normally from 100 to 200° C.

Given correct choice of these blowing agents (B) comprising intercalated liquid or comprising liquid of crystallization, the result, when comparison is made with most known blowing agent systems, has many advantages for use in transparent, opaque or colored compositions comprising plastic or comprising elastomer, and indeed, given appropriate choice of the liquid, in food-compatible compositions comprising plastic or comprising elastomer. Firstly, these compositions have excellent mechanical load-bearing properties, an example being the compression set of rubbers, which exhibit very good resilience due to the mixed-cell, mainly open-cell structure. The inventive foamable composition moreover has high general stability, since the involatile residues of the blowing agent (B) are mostly chemically inert and therefore do not interact with the plastics matrix (A). They can moreover be colored as desired, since they themselves are mostly colorless. There is no adverse effect on surface properties, such as grip, and, given appropriate choice of the liquid, they are moreover suitable for foods and meet BfR [German Federal Institute for Risk Assessment] specifications or FDA specifications. Safety aspects also favor the inventive foamable composition, since, given suitable choice of the blowing agent, it does not promote the spread of fire, and in the event of a fire there is no formation of toxic combustion products. Furthermore, there is no interaction with other constituents of the formulation in the foamable composition.

Preferred intercalated liquid and liquid of crystallization is water. Intercalated water or water of crystallization is water bound between the layers and, respectively, bound into the crystal structure, of organic or inorganic compounds, there being a very wide variety of binding ratios in these "hydrates". Examples are hydrated zeolites, phyllosilicates, salts comprising water of crystallization, e.g., in the known material gypsum, other examples being found in proteins, such as casein, and in traditional salts, such as sulfates and phosphates, e.g., Glauber's salt, $Na_2SO_4.10\ H_2O$, and also non-crystalline hydrated complex compounds. Preference is given to alkali metal sulfates, alkaline earth metal sulfates, alkali metal phosphates, and alkaline earth metal phosphates, and particular preference is given to alkali metal phosphates and alkaline earth metal phosphates, of which in turn the alkali metal phosphates are preferred, and among the alkali metal phosphates preference is given to sodium dihydrogenphosphate, disodium hydrogenphosphate, tetrasodium diphosphate and polyphosphates of higher condensation level, and among these particular preference is given to tetrasodium diphosphate and to polyphosphates of higher condensation level.

A further advantage of the inventive blowing agents (B) is their presence as a solid, which can be very easily dispersed in the composition, without additional aids. Once the blowing agents (B) have been incorporated by mixing, they are very stable and do not alter over time, given appropriate storage.

Furthermore, the inventive foamable composition can be used in any desired combination with known blowing agents, such as carbonates, nitrogen compounds, and water- and alcohol-based blowing agents, and the inventive foamable composition here improves the final properties of the foam. The blowing agents can therefore either be incorporated by mixing in the form of a solid or previously dissolved or converted to a masterbatch, or be present directly within the matrix.

The blowing agents used according to the invention are known to the person skilled in the art, and many of them are commercial products.

Examples of component (C) having microwave activity are compounds selected from the group consisting of metals and metal oxides, examples being silver or aluminum oxide. It is preferable to use oxidic compounds of metals, e.g., ferrite or more preferably magnetite (formal formula $Fe_3O_4$), and the fillers (C) here have an average particle size, with any desired particle size distribution, of from 0.1 to 1000 microns, preferably from 10 to 500 microns, and for transparent formulations preferably from 0.1 to 0.4 micron.

To improve ease of incorporation by mixing and to improve mechanical properties of the final mixture, these fillers can be treated with suitable chemicals, and this can be achieved in kneaders, mixers, dissolvers, autoclaves, etc. Suitable treatment agents are amines, alcohols, etc., but especially silanes of the general composition $Si[XR_n]_4$, where X can be a non-metal atom, such as C, N, O, P, etc.; and R can be any desired inorganic or organic radical. The compound is selected in such a way that the molecule is absorbed onto the surface of the particles having microwave activity and enters into physical bonding with these, or into chemical bonding via elimination of at least one radical at the Si—X or the X—R bond. Surface treatment with suitable agents firstly achieves better dispersion in the polymer matrix and secondly also permits coupling via vulcanization during any subsequent crosslinking.

The amounts of the fillers having microwave activity are from 0.1 to 99% by weight, preferably from 10 to 60% by weight, more preferably from 10 to 30% by weight, based on the entire composition.

The oxidic metal compounds used as starting materials according to the invention are known to the person skilled in the art and are commercially available.

(D) treated or untreated active fillers, preferably fumed or precipitated silicas, in amounts which are preferably from 0 to 80% by weight, more preferably from 0 to 50% by weight, and most preferably from 0 to 35% by weight, based on the entire composition, may optionally be used. Fillers (D), for example may be silicate fillers.

Further examples of reinforcing fillers which can be used as component (D) in the inventive compositions are fumed or precipitated silicas whose BET surface areas are at least 50 $m^2/g$, and carbon blacks and activated charcoals, e.g., furnace black and acetylene black, preference being given to fumed and precipitated silicas whose BET surface areas are at least 50 $m^2/g$. The silica fillers mentioned can have hydrophilic character or can have been hydrophobicized by known processes. In the case of mixing to incorporate hydrophilic fillers, addition of a hydrophobicizing agent is required.

The content of actively reinforcing filler (D) in the inventive crosslinkable composition is in the range from 0 to 80% by weight, preferably from 0 to 50% by weight, and more preferably from 0 to 35% by weight, based on the entire composition.

(E) is a suitable crosslinking system for condensation crosslinking, peroxide-induced crosslinking, or noble-metal-complex-catalyzed addition crosslinking, in suitable proportions, and (F) are further additives, e.g., stabilizers, non-reinforcing fillers, thermally conductive fillers, pigments, etc.

The inventive silicone-containing composition can optionally comprise, as component (F), further additives making up a proportion of up to 70% by weight, preferably from 0.0001 to 40% by weight. These additives can, by way of example, be inactive fillers, resin-like polyorganosiloxanes which differ from the siloxanes (A), dispersing agents, solvents, adhesion promoters, pigments, dyes, plasticizers, organic polymers, heat stabilizers, etc. Among these are additions such as powdered quartz, diatomaceous earth, clays, chalk, lithopones, carbon blacks, graphite, metal oxides, metal carbonates, metal sulfates, metal salts of carboxylic acids, and, fibers such as glass fibers, synthetic fibers, plastics powders.

Other materials that can be present are additives (F) which serve for controlled setting of processing time, initiating temperature and crosslinking rate of the inventive compositions, and thermally conductive fillers which raise the effectiveness of transport of microwave-induced heat.

Components (D) and (F) used according to the invention are commercially available products or can be prepared by familiar chemical methods.

The inventive compositions can also comprise, other than components (A) to (F), any further substances which have also been used hitherto for preparation of silicone-containing compositions.

The inventive organopolysiloxane compositions can, if required, be dissolved, dispersed, suspended, or emulsified in liquids. The inventive compositions can in particular as a function of viscosity of the constituents and solids content, be of low viscosity and pourable, pasty, pulverulent, or else conformable, high-viscosity compositions, as is known to be the case for the compositions which persons skilled in the art often call silicone oils (fluids), RTV-1, RTV-2, LSR and HTV. With regard to the elastomeric properties of the crosslinked inventive silicone compositions, the entire spectrum is likewise covered, starting from extremely soft silicone gels and proceeding by way of rubbery materials and extending as far as highly crosslinked glassy silicones.

Known processes can be used to prepare the inventive silicone-containing compositions, an example of a preferred process being uniform mixing of the individual components. The sequence here is as desired, but it is preferable to give precedence to any necessary treatment of component (C) having microwave activity and its mixing with the polymer matrix. When it is added, the filler here can be in the form of a solid or in the form of a masterbatch pasted with suitable agents. As a function of the viscosity of (A), the mixing process may take place, for example, using a stirrer, a dissolver, a roll, or a kneader. The component (C) can also be encapsulated in an organic thermoplastic or thermoplastic silicone resin.

The blowing agent (B) can likewise be incorporated by mixing into the polymer matrix in any desired manner, preferably in the form of a masterbatch.

Each of components (A) to (F) used according to the invention can be a single type of this component or else a mixture composed of at least two different types of this component.

Given the presence of crosslinkable groups, the inventive compositions can, like the crosslinkable compositions known hitherto, be crosslinked (vulcanized). The temperatures here are preferably from 40 to 220° C., more preferably from 100 to 190° C., at atmospheric pressure or under a pressure of from 900 to 1100 hPa. However, it is also possible to apply higher or lower temperatures and pressures, this being a matter that depends on the duration and frequency of irradiation and the geometry and mode of production of the desired part.

A decisive advantage of the inventive compositions is their rapid crosslinkability via microwave radiation by virtue of the filler (C). The crosslinking can also be carried out photochemically with high-energy radiation, e.g., visible light of short wavelengths and UV light, or with a combination of thermal and photochemical excitation.

The present invention further provides extrudates, composites, and moldings, produced via crosslinking and expansion of the inventive compositions.

The inventive compositions, and the crosslinking products that can be produced inventively therefrom, can be used for any of the purposes for which organopolysiloxane compositions or elastomers or foamed compositions have also been used hitherto, with the advantage of rapid processing and the presence of microwave absorption, also in the final part. These purposes comprise by way of example silicone coating or impregnation of any desired substrates, the production of moldings, e.g., by injection-molding processes, vacuum extrusion processes or other extrusion processes, mold casting, compression molding, mold processing, and use as a sealing, embedding, or potting compositions, etc.

A factor of particular interest is the microwave-induced heating of silicone elastomers and siloxane-containing thermoplastic elastomers or, respectively, thermoplastic vulcanisates, and resins, because homogeneous heating occurs, since no introduction of heat from the outside to the inside (via, for example, hot air or a heated mold surface), but instead uniform generation of heat takes place in the entire material.

This uniform heating allows a problem in silicone technology to be solved: the uniform production of siloxane-containing foams in desired thicknesses and dimensions. Silicones (elastomers, thermoplastic elastomers and resins) are generally compositions which crosslink rapidly, i.e., rapidly become rigid. Since the crosslinking (vulcanization) works against any simultaneously proceeding expansion, the expansion, i.e., foaming, of silicone compositions is a difficult procedure.

An advantage of the inventive compositions is that they can be used to produce items which have not only low density but also have appropriate thermal conductivity (using from 0.1 to 15 parts of fillers (C): low thermal conductivity; from 20 parts: increased thermal conductivity) and/or capability for heating induced via microwave radiation, examples being heating mats, insulating sheets, attenuating elements, etc., and foam parts whose magnetic moment makes them, for example, detectable by sensors or capable of magnetic excitation.

An advantage of the inventive compositions is that they can be produced in a simple process which uses readily accessible starting materials without any risk of mutual adverse effect and which is therefore cost-effective and low-risk. A further advantage of the inventive compositions is that, by virtue of the direct internal generation of heat, they permit substantially faster vulcanization and expansion, and therefore permit accelerated production of expanded items to an extent that was hitherto impossible.

An additional advantage of the inventive compositions is that, by virtue of the increased ease of mixing to incorporate the treated heavy fillers (C), density can be adjusted not only to densities typical of foam (around 0.2 to 0.5 gram per cubic centimeter) but also up to four times the initial density of the foam, this being impossible with other fillers used in the elastomer sector. It is therefore possible to obtain heavy, "high-value" foams with novel properties of damping and of insulation.

An advantage of the inventive silicone-containing compositions is that, by virtue of the variation of the mixing ratio of a plurality of morphologically different fillers having microwave activity, it is possible to cover a wide range of frequencies, thus permitting microwave vulcanization and expansion to be balanced with one another within wide limits.

Another advantage of the inventive compositions is that the expanded crosslinked compositions do not exhibit any substantial impairment of mechanical or other physical properties when compared with unfilled expanded compositions, even for high proportions of fillers having microwave activity. Indeed, there is improved resistance to hot air and chemicals.

Another advantage of the inventive compositions is that their expanded vulcanisates with exclusively magnetite as filler having microwave activity and with blowing agents approved for food use can be used in direct contact with foods, and there is therefore no need for any complicated additional coatings or backings, e.g., aluminum, to avoid direct contact.

A still further advantage of the inventive compositions is that their expanded vulcanisates have a completely homogeneous foam structure and therefore have completely homogeneous properties even across very large wall thicknesses (greater than 5 cm), together with a continuous, smooth surface, this being not achievable hitherto.

Another advantage of the inventive compositions is that they can be foamed as desired via suitable control of the radiation, i.e., production of genuine integral skin foams (i.e., having large pores internally, and expanded to give a compact material externally) is possible for the first time using siloxane-containing compositions. Exposure to external heat previously gave the reverse effect! It is even possible to achieve defect-free foaming of complicated geometries, because expansion can be shifted in the direction of exposure to radiation, as a function of power (wattage).

In the examples described below, all parts and percentages are based on weight unless otherwise stated. Unless otherwise stated, the examples below are carried out at ambient atmospheric pressure, i.e., at about 1000 hPa, and at room temperature, i.e., at about 20° C., or at a temperature which becomes established when the reactants are combined at room temperature, without additional heating or cooling.

1) Preparation of a microwave-foamable and -vulcanizable silicone composition which is suitable for contact with foods and has good thermal-insulation effect (e.g., for baking sheets, container insulation, etc.), and vulcanization and expansion of the same:

100 parts of a poly(dimethyl)methylvinylsiloxane are used as initial charge at room temperature in a kneader. At a temperature of 80° C., 2 parts of a polydimethylsiloxane and 15 parts of fine-particle silica (FPS) are added in portions, and the material is kneaded for 10 min after each addition step. The material is then again kneaded and heated at 160° C. for 3 h. Ten parts of magnetite whose average grain size is 150 microns are then added in portions and kneaded at room temperature. 3 parts of a silazane and 1 part of water are then added, and the mixture is kneaded for 1 h at 70° C. After cooling, the mixture is removed and, on the roll or in the kneader, provided with vulcanization additives for platinum-catalyzed addition crosslinking, and 1 part of sodium pyrophosphate hydrate and 1 part of sodium carbonate hydrate (Merck KGAA).

The finished mixture is extruded to give a parison, which is exposed for 5 minutes to radiation in a household microwave at 500 Watts; the parison is then cooled for 5 minutes in the microwave.

The part produced has approximate final Microshore hardness of 40 and has homogeneous foaming throughout with a continuous surface skin, its density being 0.7 g/cm$^3$ and its thermal conductivity (lambda value) being 0.04 (i.e., insulating).

2) Preparation of a rapidly crosslinkable silicone composition having high microwave activity for soft but very heavy foam sheets, and production of the same:

100 parts of a silicone mixture composed of 90% of a polydimethyl(vinyl)siloxane whose approximate molecular weight is 1500 and of 10 parts of a silica whose BET surface area is about 200 m$^2$/g are mixed in a kneader at room temperature with 300 parts of magnetite which has been silazane-treated in a sealed kneader, and the mixture is kneaded at 70° C. for 1 h. After cooling, the mixture is removed and 0.7 part of ELASTOSIL® AUX crosslinking agent E (2,4-dichlorobibenzoyl peroxide, 98% purity) and 6 parts of gas-filled hollow thermoplastics beads (e.g., polyacrylonitrile/isobutane) are admixed with the mixture on the roll. After extrusion from a slot die, the crude rubber sheet is continuously expanded and foamed with the aid of positionable microwave sources on a Teflon conveyor belt.

The sheets obtained have a continuous, smooth surface, their density being 2.2 g/cm$^3$ and their Microshore hardness being 25.

3) Production of a homogeneously foamed part with high wall thickness (e.g., a foam ball) in a closed mold:

The mixture prepared in 1) is likewise extruded to remove admixtures of air. The parisons are weighed out in such a way as to achieve half of the volume of the cavity (mold cavity) using an assumed specific gravity of 1 (i.e., 150 grams for 300 cm$^3$ of cavity volume). The parisons are placed in the mold cavities and the closed mold (composed of plastic which has sufficient heat resistance but no microwave activity, e.g., PEEK) is exposed to 600 Watts of radiation for 5 minutes in an industrial microwave (as used, for example, for the redrying of emulsions).

The foam moldings obtained after demolding have homogeneous foaming throughout with a continuous surface, their Microshore hardness being 35 and their density being 0.65 g/cm$^3$.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A microwave foamable composition comprising:
   (A) at least one compound bearing crosslinkable organic radicals,
   (B) a blowing composition comprising at least one blowing agent which releases gas on heating wherein the blowing agent which releases gas on heating consists of a mixture of two components, a first component consisting of one or more inorganic compounds which contain water of crystallization or intercalated water other than sodium pyrophosphate hydrate, and a second component which is sodium pyrophosphate hydrate, and
   (C) magnetite powder,
   the composition being foamable upon exposure to microwave energy to produce a foam of uniform foam structure and a continuous, smooth surface.

2. The composition of claim 1, wherein the compounds which bear crosslinkable organic radicals contain aliphatic carbon-carbon multiple bonds.

3. The composition of claim 1, wherein the compounds which bear crosslinkable organic radicals are organosilicon compounds.

4. The composition of claim 1, wherein the compounds which bear crosslinkable organic radicals are crosslinkable by peroxidically crosslinking, sulfur-crosslinking, bisphenol-crosslinking, or platinum-catalyzed-addition-crosslinking.

5. A foamed molding, which comprises a crosslinkable composition of claim 1 which has been heated by microwaves to a temperature sufficient to liberate water of hydration or intercalation and then cooled.

6. An integral skin silicone foam comprising a foamed and crosslinked composition of claim 1, and having a uniform foam structure.

7. The microwave foamable composition of claim 1, wherein the at least one compound bearing organic radicals comprises a polyorganosiloxane bearing aliphatically unsaturated groups and a peroxide curing catalyst.

8. The microwave foamable composition of claim 1, wherein the composition includes an aliphatically unsaturated organopolysiloxane and vulcanization additives for platinum-catalyzed addition crosslinking.

9. The microwave foamable composition of claim 1, wherein a blowing agent first component which releases gas upon heating is sodium carbonate hydrate.

10. The composition of claim 7, wherein the composition is prepared by admixing magnetite powder and the blowing agent composition components with the organopolysiloxane.

11. The composition of claim 8, wherein the composition is prepared by admixing magnetite powder and the blowing agent composition components with the organopolysiloxane.

* * * * *